United States Patent [19]

Pettit

[11] Patent Number: 4,474,168
[45] Date of Patent: Oct. 2, 1984

[54] SOLAR HEATED SWIMMING POOL

[76] Inventor: Frederick M. Pettit, 1411 Point Albino Rd. S., Ridgeway, Ontario, Canada, L0S 1N0

[21] Appl. No.: 319,071

[22] Filed: Nov. 9, 1981

[51] Int. Cl.³ ............................................. F24J 3/02
[52] U.S. Cl. ................................. 126/416; 126/450; 126/448; 126/449; 4/493
[58] Field of Search ............... 126/415, 416, 432, 448, 126/449, 450, 426; 52/248, 169.6, 169.7, 699.8, 220, 302, 303; 4/506, 493, 507; 239/267, 268, 269, 276, 279

[56] References Cited

U.S. PATENT DOCUMENTS

| | | | |
|---|---|---|---|
| 1,542,188 | 11/1923 | Tanner | 52/169.9 |
| 3,553,744 | 6/1969 | Gillen | 52/169.7 |
| 3,667,071 | 6/1972 | Hoch et al. | 4/506 X |
| 3,840,908 | 10/1974 | Greene | 4/506 |
| 3,875,699 | 4/1975 | Lamarre | 239/276 X |
| 3,933,311 | 1/1976 | Lemelson | 239/276 |
| 4,159,017 | 6/1979 | Novi | 126/448 |
| 4,164,933 | 8/1979 | Alosi | 126/447 |
| 4,191,243 | 3/1980 | Donzis | 237/69 X |
| 4,280,477 | 7/1981 | Divine | 126/416 |
| 4,290,413 | 9/1981 | Goodman et al. | 126/448 |
| 4,303,060 | 12/1981 | Mart | 126/448 |
| 4,312,323 | 1/1982 | Domenech | 126/426 X |
| 4,333,186 | 6/1982 | Lankheet | 126/415 X |
| 4,381,763 | 5/1983 | Kahl | 126/416 |

FOREIGN PATENT DOCUMENTS

| | | | |
|---|---|---|---|
| 23738 | 2/1977 | Japan | 126/448 |
| 52-23738 | 2/1977 | Japan | 126/448 |

Primary Examiner—Samuel Scott
Assistant Examiner—Carl D. Price
Attorney, Agent, or Firm—Christel, Bean & Linihan

[57] ABSTRACT

A swimming pool construction incorporating solar heating means to heat the pool water to a desired level. The pool includes a surrounding safety fence supported by a plurality of fence supports which are hollow and which include internal passageways. The pool water is passed through the pool support passageways whereupon it absorbs heat from the sidewalls of the fence supports, the surfaces of which have been heated by solar radiation. The fence supports can be made of plastic or other materials, but preferably are dark for improved absorptivity. The pool water can be passed serially through each of the fence supports and suitable thermostat control means can be provided to limit the water temperature increase.

8 Claims, 9 Drawing Figures

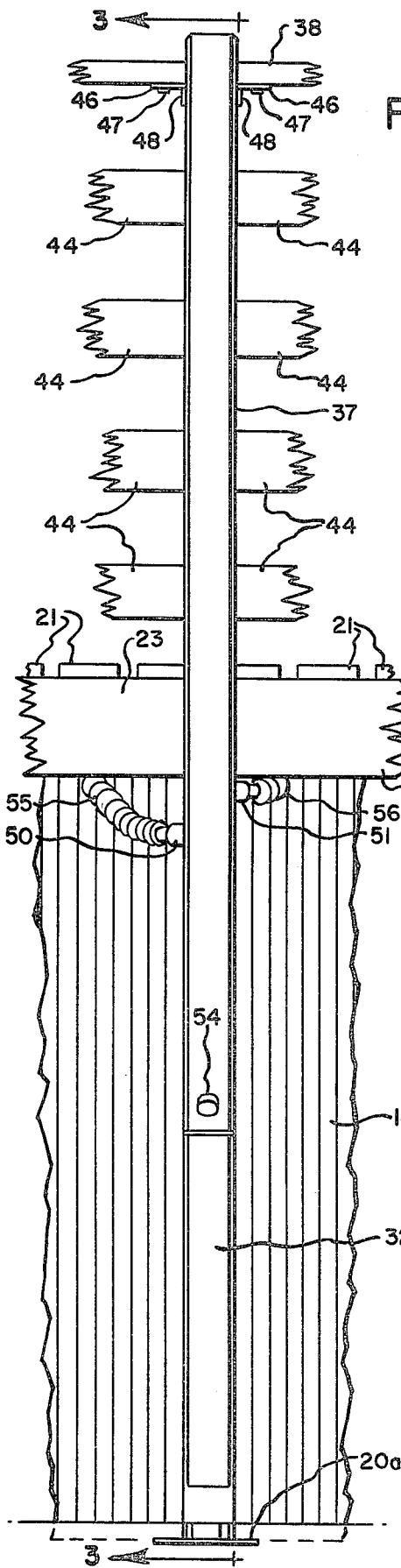
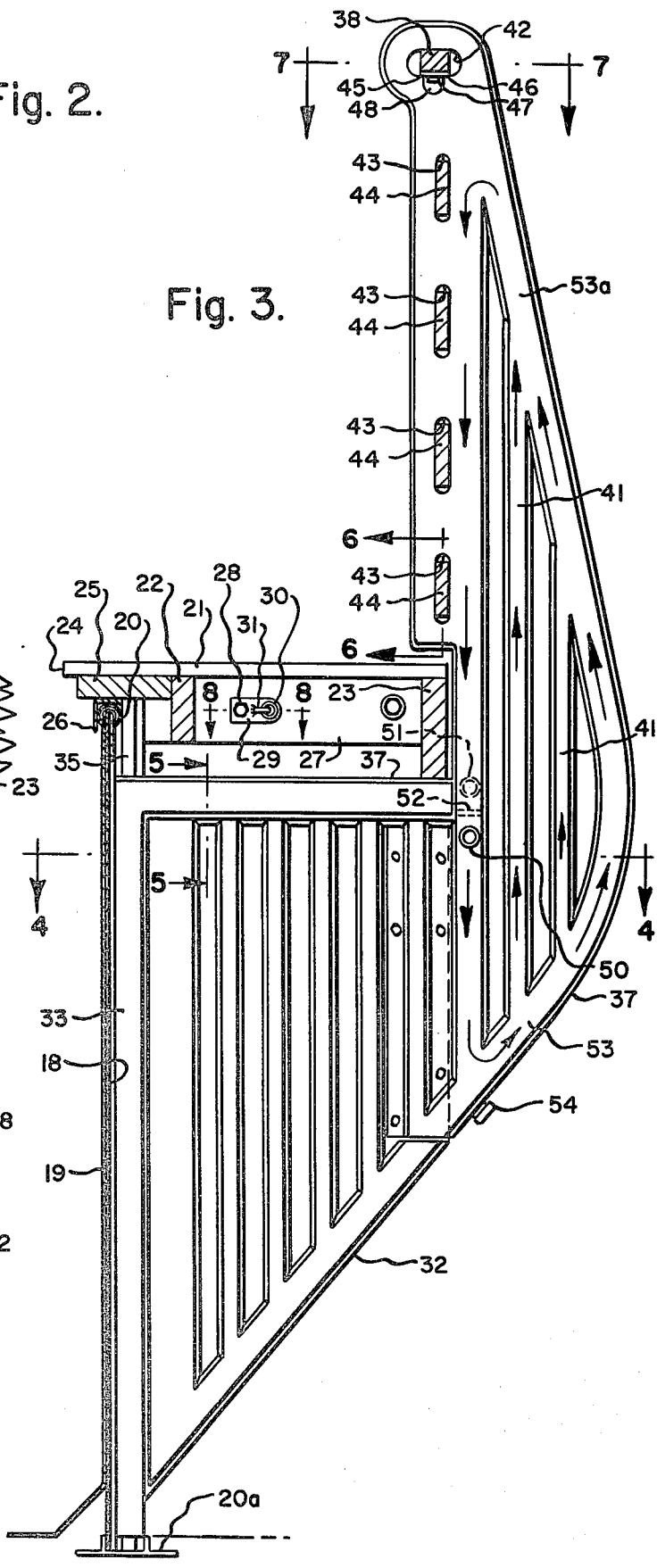
Fig. 2.
Fig. 3.

SOLAR HEATED SWIMMING POOL

BACKGROUND OF THE INVENTION

This invention relates to swimming pools and more particularly to an improved, energy-saving swimming pool structure utilizing solar radiation to heat the pool water.

The water temperature of the local water supply can vary from place to place and can even vary over the course of the swimming season. Generally, however, that temperature is significantly lower than the level for comfortable swimming. Consequently, most swimming pools of any particular size, whether they be home pools or commercial pools, incorporate a heating device to raise the pool water temperature to a desired level, which is higher than the temperature of the water supply. Although the exposure of the pool water to sunlight provides some heat, the effect is minimal. Furthermore, since water loss occurs due to evaporation, the replacement of that evaporated water with cooler water from the local water supply tends to keep the pool temperature low. Additionally, cooling of the pool water during the evening hours also tends to depress the temperature. All of the foregoing effects dictate the need for a heating device to elevate the pool water temperature to a comfortable level and to maintain it at that level. Such heating devices are usually electric heaters of one type of another and require substantial energy, which, in recent times, has become more and more costly, and likely will increase in cost in the future.

SUMMARY OF THE INVENTION

It is an object of the present invention to provide a swimming pool construction whereby heating of the pool water is accomplished without the need for costly, energy-consuming devices.

It is another object of the present invention to provide an improved swimming pool construction whereby solar radiation is utilized to heat the pool water temperature to the desired level and maintain it at that level.

It is still another object of the present invention to provide a swimming pool construction utilizing solar radiation to heat the water and wherein the means for utilizing the avialable solar energy is integrated with the pool structure.

It is still a further object of the present invention to provide a swimming pool construction utilizing solar radiation to heat the pool water and wherein the means for collecting the solar energy is positioned in such a way as to be exposed to the sunlight for a maximum period of time.

Briefly stated, in connection with one aspect of the present invention, a swimming pool construction is provided wherein the pool includes an encircling safety fence arrangement wherein the vertical support members supporting the safety fence are provided in a hollow form and include water passageways extending therewithin and which are oriented and configured in such a fashion as to be exposed to sunlight for a major portion of the daylight hours. The vertical members are interconnected with means to cause the pool water to be circulated therethrough and thus be heated by the exposure of those members to the sun. Means are provided in the support members for supporting a hand rail and a plurality of intermediate railings to serve as a safety fence and to control access to and from the pool.

BRIEF DESCRIPTION OF THE DRAWINGS

FIG. 2 is an elevational view, partially broken away, showing an end view of one of the pool and fence supporting elements and its surrounding structure, taken along the line 2—2 of FIG. 1.

FIG. 3 is a side elevational view, partially in section, of the pool and fence supporting structure shown in FIG. 2.

DESCRIPTION OF THE PREFERRED EMBODIMENTS

Figure 1:
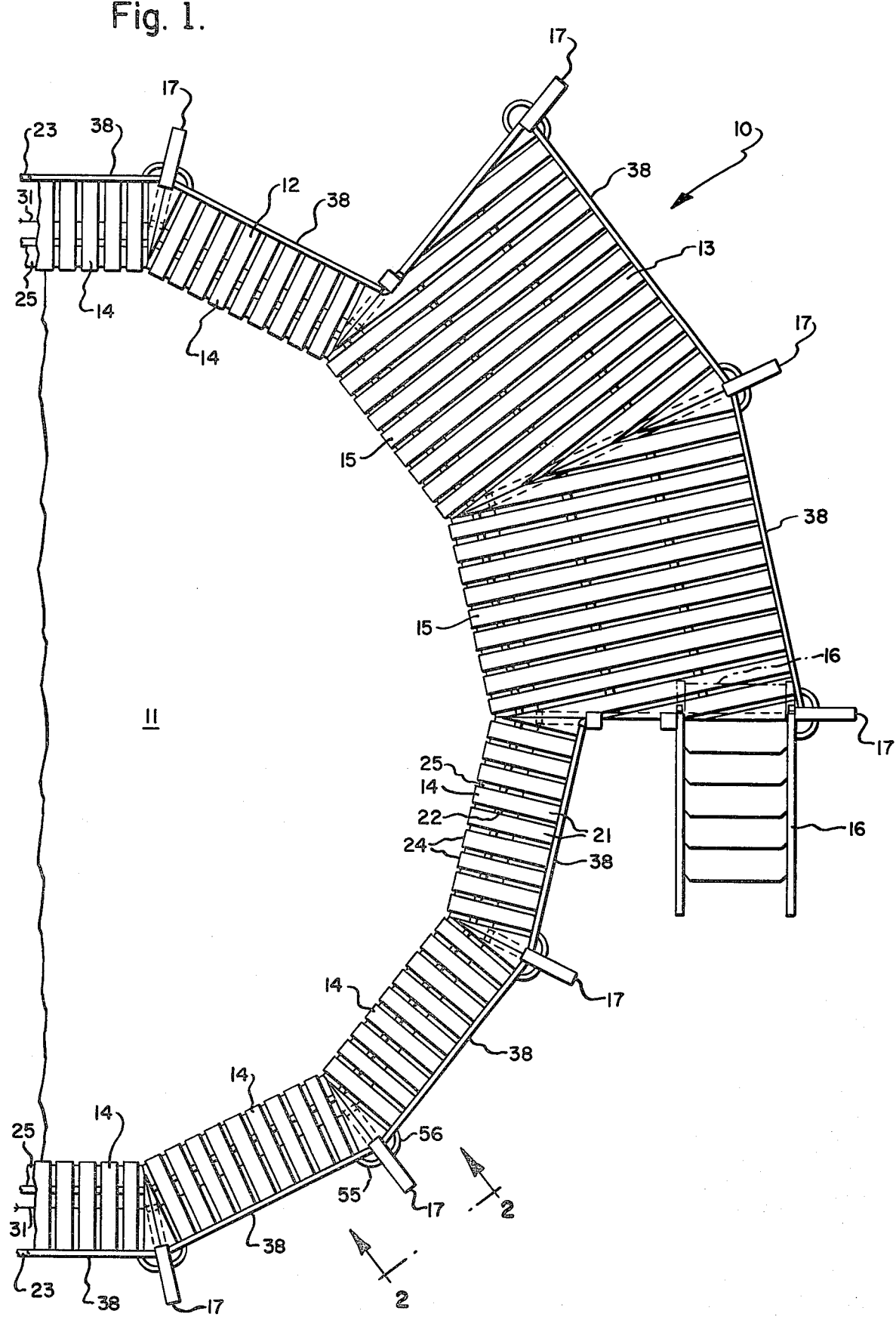
FIG. 1 is a partial plan view of an above-ground swimming pool in accordance with the present invention having a peripheral walkway and an enlarged deck area for seating, and which incorporates a safety fence around the walkway and deck areas, the fence supporting structure including means to heat the pool water by means of solar radiation.

Referring now to the drawings, and particularly to FIGS. 1, 2, and 3 thereof, there is shown an above-ground swimming pool 10 including a central water reservoir 11, which is surrounded by a deck or walkway 12 which includes an enlarged deck area 13. Although the pool configuration shown in FIG. 1 is of a substantially circular cross section and formed from 14 substantially equal linear segments, or deck elements 14 positioned end-to-end, it would be apparent that other pool shapes can also be provided, such as circular, square, rectangular, and the like, and it is not intended to limit the applicability of the present invention to the particular pool shape shown.

Walkway 12 is a relatively narrow structure which surrounds water reservoir 11 and permits access thereto from any particular peripheral point. The major portion of walkway 12 is formed by interconnecting a plurality of individual, relatively narrow deck elements 14. As shown in FIG. 1, walkway 12 also can include one or more larger deck panels 15, which are so sized as to be capable of accommodating a number of end tables, umbrella tables, chairs, lounges, or the like. Access to deck area 13 is obtained by means of a stairway 16, which can be hinged to deck area 13 in such a way that it can be pulled up and secured in a substantially perpendicular position relative to the surface of deck area 13 to prevent unintended access to water reservoir 11.

Each of the individual deck elements 14 is substantially trapezoidal in plan view and the ends of adjacent deck elements are secured together in a manner to be hereinafter described and are supported by means of a plurality of spaced deck support gussets 17. The generally trapezoidal shape permits deck elements 13 and deck panels 15 to be interconnected to provide a substantially circular pool with a substantially circular peripheral walkway 12.

As best seen in FIGS. 2 and 3, water reservoir 11 is defined by a plurality of pool wall supports 18, which can be of a corrugated form, as shown, for increased rigidity. Preferably, pool wall supports 18 are formed from corrugated, galvanized steel, but other materials and thicknesses can also be used, if desired. Positioned on the ground and draped along and over pool wall supports 18 is an imperforate pool liner 19, which typically is formed from polyvinylchloride plastic and can have a thickness ranging from about 15 mils to about 25 mils, although the other materials and other thicknesses can also be used, if desired. Pool liner 19 is preferably continuous and is capable both of retaining the water and also of resisting breaks and tears. Liner 19 is draped over the top edge of pool wall support 18, which preferably has a rounded top surface to avoid cutting liner 19, and a retainer 20 in the form of a split tube is positioned over the uppermost edge of pool wall support 18 to resiliently grip pool liner 19 and hold it against pool wall support 18 so that the liner does not fall back into water reservoir 11. Retainer 20 also serves to form a supporting, ring-like structure on the tops of adjacent supports 18 to hold walls 18 in the proper position. Pool wall supports 18 are seated in a lower channel member 20a which can be positioned on the surface of the ground, or, as shown, slightly recessed below the surface, and which provide vertical support to wall supports 18.

Deck elements 14 include a plurality of substantially parallel, spaced deck slats 21 which extend generally radially with respect to the interior of water reservoir 11 and which are nailed to and supported by a transversely positioned deck front support member 22, and by a transversely positioned deck rear support member 23 spaced radially outwardly therefrom. Deck front support member 22 is positioned radially outwardly from the innermost edges of the deck slats to provide an area within which a sill member 25 can be positioned. Sill member 25 includes a metallic angle 26 which is adapted to rest on split tube retainer 20 at the upper edge of pool wall support 18. At each of the ends of the respective deck elements 14 are radially positioned end support members 27 which are secured to and positioned at the ends of deck front support members 22 and deck rear support members 23. The construction of deck panels 13 is similar, except that longer deck slats 21 are employed to provide a larger area.

Figure 8:
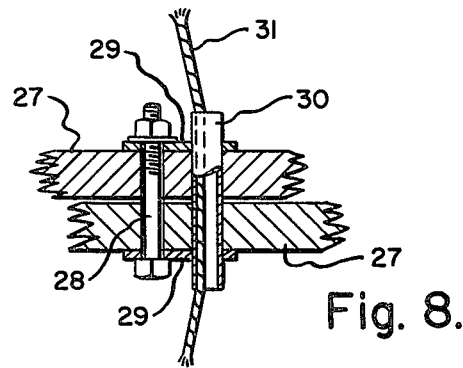
FIG. 8 is a fragmentary cross-sectional view, partially broken away, showing the method of interconnection of adjacent deck and walkway elements and the arrangement for the deck and walkway supporting cable, taken along the line 8—8 of FIG. 3.

In assembling walkway 12, the respective deck elements 14 are placed in end-to-end relationship and adjacent ends are bolted together as by means of bolts 28. Positioned adjacent the outermost faces of contacting end support members 27 are load plates 29, through which bolts 28 pass and which are intended to distribute the bolt loads over a larger portion of the surface area and thereby prevent bolt 28 from excessively digging into the wooden end support members 27, as shown in FIG. 8. Additionally, each load plate 29 and also the adjacent end support members 27 include aligned openings within which are positioned a cable tube 30, the purpose of which is to prevent the supporting cable 31, which interconnects the several deck elements 14 and holds them in position about the periphery of the pool, from digging into end support members 27. As indicated, cable 31 supports the respective deck elements 14 and deck panels 15 and counterbalances the outwardly directed hydrostatic force against pool wall supports 18 when the pool is filled with water. The tension in cable 31 can be made adjustable by means of turnbuckles (not shown) to interconnect several cable sections which define an endless supporting cable.

Figure 4:
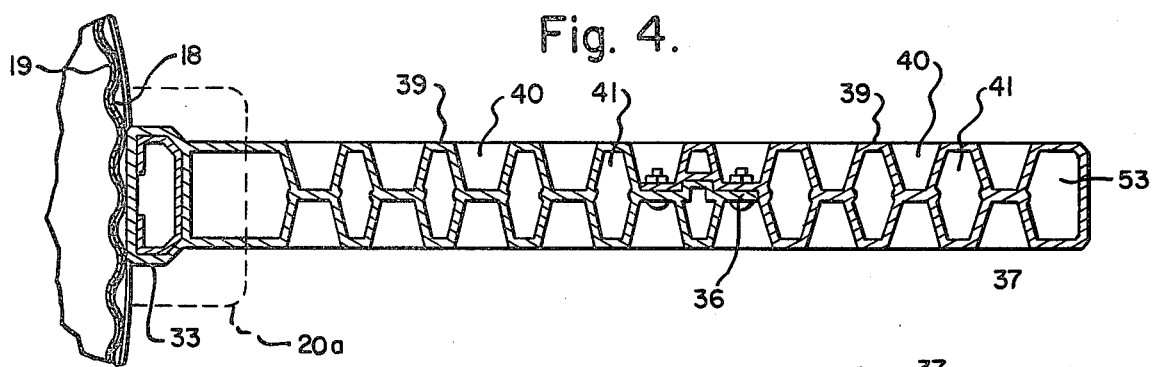
FIG. 4 is a transverse cross-sectional view of the pool and fence supporting structure taken along the line 4—4 of FIG. 3.
Figure 5:
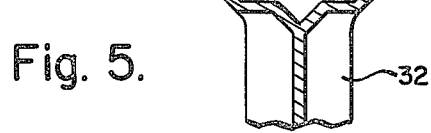
FIG. 5 is a fragmentary cross-sectional view of a part of the pool deck supporting structure taken along the line 5—5 of FIG. 3.

Referring once again to FIG. 3, each of the respective deck elements 14 is vertically supported both by pool wall support 18 and by a deck support gusset 32, which can be of generally trapezoidal shape as shown. The longer side 33 of the deck support gusset is positioned adjacent the outermost surface of pool wall support 18 to resist the outward pressure which results when water reservoir 11 is filled with water. A support insert 35, which can be a metallic channel as shown in FIG. 4, is provided along side 33 for additional rigidity. Deck rear support member 23 is supported along the upper edge 34 of deck support gusset 32. Thus, when walkway 12 is in assembled condition, cable 31 provides a restraining force to hold walkway 12 together and to keep pool wall supports 18 from moving outwardly by transmitting radially inwardly directed restraining forces along end support members 27 to support insert 35 carried by deck support gusset 32. Vertical support for the deck itself is provided both by the upper edge of support insert 35, which rests against sill member 25, and by upper edge 34 of deck support gusset 32, thereby providing a self-supporting structural framework. The lower edge of support insert rests against lower channel member 20a, which distributes the vertical loads over a larger area.

Attached to and extending outwardly and upwardly from the outermost portion 36 of deck support gusset 32 is a rail support member 37 which is parallel to gusset 32 and extends upwardly beyond the surface of walkway 12 to a point to provide a suitable support arrangement for the walkway handrail 38.

The interconnection between rail support members 37 and deck support gusset 32 is shown in cross section in FIG. 4. As there shown, the respective members are each formed to provide a series of verticaly extending ridges 39 alternating with vertically extending channels 40. As shown, ridges 39 define hollow elements 41, the function of which is to provide increased strength and rigidity to the respective structural members, and in the case of rail support member 37 to provide an internal flow path to permit the flow of water therewithin, as will hereinafter be described. Deck support gusset 32 and rail support member 37 are preferably hollow, blow molded structures and can be made from high density polyethylene or similar substantially rigid plastics which are capable of being blow molded. Preferably, at least rail support member 37 is dark in color to provide a surface which will absorb a greater amount of radiant energy.

Figure 7:
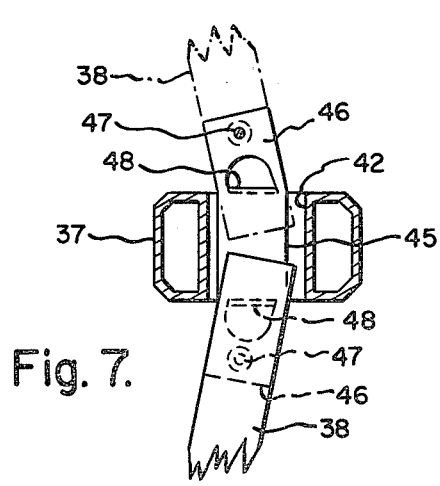
FIG. 7 is a fragmentary plan view, partially in section, of the fence hand rail supporting structure of the fence supporting member taken along the line 7—7 of FIG. 3.

Referring once again to FIGS. 2 and 3, rail support member 37 includes an upper, handrail opening 42 and a series of spaced, intermediate rail recesses 43, the purpose of which is to receive and hold intermediate rail members 44 to thereby provide a safety fence around walkway 12 of the swimming pool. Handrail opening 42 extends completely through rail support member 37 and is adapted to hold a handrail which is comprised of separate handrail elements 38 which are interconnected by means of a handrail connecting and supporting bracket 45. As best seen in FIG. 7, bracket 45 underlies handrails 38 and rests on the lower surface of handrail opening 42. The outermost ends 46 of bracket 45 extend outwardly beyond the rail support member 37, and include apertures for bolts 47 to secure the handrail thereto. A pair of downwardly depending ears 48 are formed by cutouts in supporting bracket 45, the cutouts extending downwardly in parallel planes and adapted to engage the sides of rail support member 37.

Figure 6:
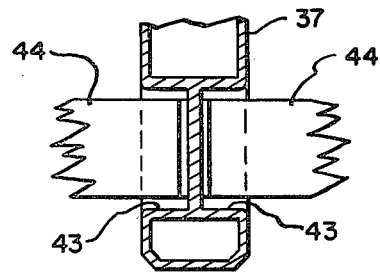
FIG. 6 is a fragmentary cross-sectional view of an intermediate fence rail recess and support of the fence supporting member taken along the line 6—6 of FIG. 3.

Intermediate rails 44 are held in intermediate rail recesses 43, which, as shown, do not pass completely through rail support member 37 but which have a sufficient depth to support intermediate rails 44 as illustrated in FIG. 6. If desired, recesses 43 can be made to extend completely through rail support member 37.

Referring once again to FIG. 3, rail support member 37 includes a series of parallel, spaced hollow chambers 41 which extend in a generally vertical direction, the cross-sectional configuration of which is illustrated in FIG. 4. The hollow chambers 41 along with upper and lower headers 53a, 53 form passageways which permit the flow of pool water through rail support member 37 in order to expose the water to the plastic surface thereof, which has been heated by the sun, and thereby to permit transfer of the heat therefrom and heat the pool water to avoid the consumption of other forms of energy, which would otherwise be required to provide the desired temperature elevation. As shown in FIGS. 2 and 3, rail support member 37 includes a water inlet 50 on one side and a water outlet 51 on the opposite side. Water inlet 50 and water outlet 51 can be positioned in the same vertical channel and if so, are preferably separated by an interior barrier wall 52 in order to prevent direct flow from the inlet to the outlet. Thus, barrier 52 causes the water to flow in a direction away from outlet 51, which as shown in FIG. 3 is a vertically downward direction into a distributor passageway in the form of a hollow end wall 53 in rail support member 37 and thence upwardly along hollow end wall 53 and also upwardly through the intermediate hollow chambers 41, or branch passageways, which interconnect with hollow end wall 53, to a collector passageway 53a and to the uppermost portion of rail support member 37, whereupon the water flows downwardly past intermediate rail recesses 43 and thence to water outlet 51. Hollow end wall 53 serves as a distribution manifold to conduct the pool water to the several hollow chambers 41. A bleed port (not shown) can be provided in the upper portion of rail support member 37 to release air entrapped therein when water is introduced through water inlet 50.

Thus, by its passage through rail support member 37 the pool water is exposed to considerably surface area thereof, which, because of its position above deck 12, is exposed to sunlight for a considerably portion of the day. The water absorbs the heat from the surfaces of rail support member 37 and thereby has its temperature elevated. When it is desired to winterize the pool, the water in rail support member 37 can be drained through a drain opening which can have a threaded drain plug 54 secured thereto. As best seen in FIG. 2, flexible tubing in the form of a conduit having a water inlet tube end 55 and a water outlet tube end 56 is provided to convey the pool water to and from rail support member 37.

Figure 9:
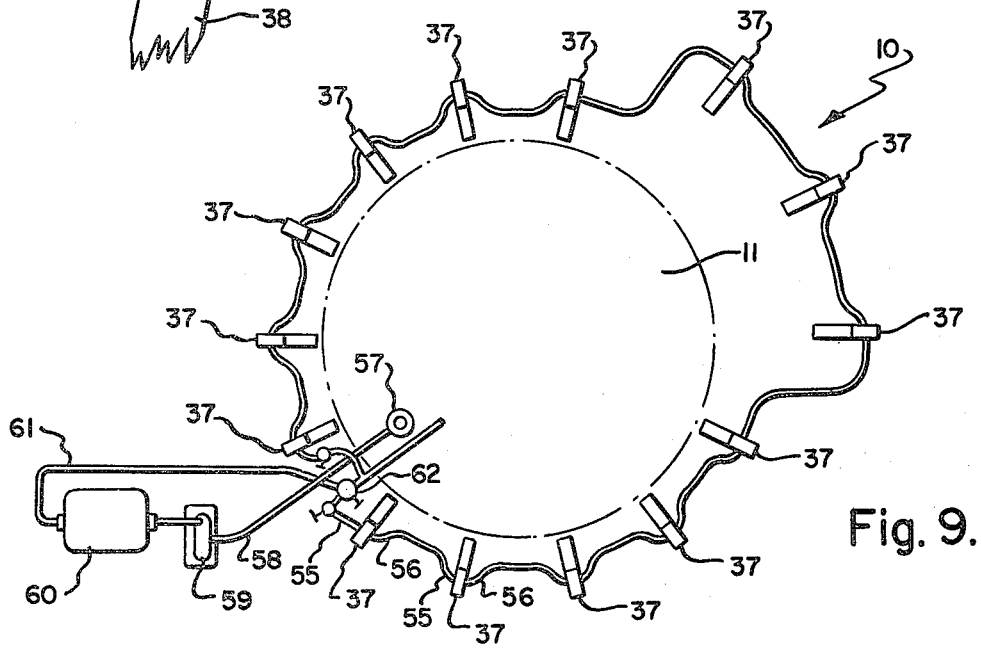
FIG. 9 is a diagrammatic view showing one possible recirculation flow path for the pool water through the several fence support members in a serial arrangement.

Referring now to FIG. 9, the flow path of the pool water through the respective rail support members 37 is illustrated. As there shown, the pool skimmer 57 provides a pool water inlet and includes a conduit 58 to a pump 59 which is operated to circulate the pool water through a filter 60 whereupon the pool water in a pool not including a solar energy collector in accordance with the present invention is returned to the pool through a return conduit 61. In a system utilizing the present invention, however, return conduit 61 includes a three-way valve 62, which is adapted to control the flow to return it to the pool or to direct it to water inlet tube 55 associated with the first rail support member 37 adjacent the pumping system. Thereafter, the pool water is circulated through the first rail support member 37 and exits therefrom through water outlet tube 56 which is connected to the inlet of the next adjacent rail support member 37 and thus conveys the water through that rail support member as well. Thereafter the water is successively passed serially through each of rail support members 37, in a counterclockwise direction as shown in FIG. 9, whereupon its temperature is progressively increased after its passage through each rail support member, and after passing through the final rail support member it is returned to the pool in heated condition and then mixes with the water in water reservoir 11 to raise its temperature.

It can thus be seen that the water circulation system illustrated and described permits the collection of solar energy by means of circulating the pool water through the rail support members and thereby avoids the use of natural gas or electricity, which would otherwise be required to heat the water. Although shown as a continuous loop from the first rail support member to the final one, the circuit can be made to include less than all of the rail support members, if desired. Additionally, although shown in terms of a series arrangement, it would be apparent that suitable piping arrangements could be provided to permit the pool water to flow into each rail support member directly from the water reservoir and to exit from each rail support member directly to the water reservoir, which would provide a substantially parallel flow path.

Control of the water temperature can be maintained by means of a thermostat (not shown) which can be so arranged to automatically control the operation of the three-way valve such that if the pool water reaches a predetermined elevated temperature, the valve would close to prevent access to the rail support member circuit and would permit the pool water from the filter to be returned directly to the water reservoir.

The invention disclosed in the foregoing description, although in terms of a specific embodiment involving an above-ground pool, is also applicable to an in-ground pool having a safety fence, the rail support members of which can be secured in the ground in a conventional manner. Similar means can be provided as herein disclosed to convey the pool water from the pool to and from the rail support members to accomplish the same purpose as hereinabove described.

While particular embodiments of the present invention have been illustrated and described, it will be apparent to those skilled in the art that various changes and modifications can be made without departing from the spirit and scope of the invention, and it is intended to cover in the appended claims all such changes and modifications that fall within the scope of the present invention.

What is claimed is:

1. A swimming pool construction of the type which is capable of utilizing solar energy to heat pool water, said swimming pool construction comprising:

pool wall supports which enclose a water reservoir;

a plurality of deck support gussets disposed adjacent said pool wall supports and extending generally normal thereto;

a deck which is supported at least in part by said deck support gussets, said deck also enclosing said water reservoir;

a safety fence enclosing said deck, said safety fence including a plurality of generally horizontally disposed non-fluid conducting rail members;

a plurality of generally vertically extending hollow rail support members which extend upwardly above the deck, each of the hollow rail support members being interconnected with an associated deck support gusset, each of the hollow rail support members containing a plurality of internal passageways and further including water inlet and outlet means interconnected with the passageways; and conduits capable of conveying pool water from said water reservoir to and through the inlet means, passageways and outlet means of each of said hollow rail support members and then back to said water reservoir wherein said hollow rail support members form the only active solar energy collecting elements of said safety fence.

2. The swimming pool construction as set forth in claim 1 wherein said conduits includes water conduits extending between and connecting the inlet of one rail support member with the outlet of an adjacent rail support member whereby series flow is permitted through adjacent support members.

3. The swimming pool construction as set forth in claim 1 wherein the internal passageways include upper and lower headers and a plurality of generally vertically extending branch passageways extending therebetween.

4. The swimming pool construction as set forth in claim 1 wherein said hollow rail support members each include a plurality of vertically spaced apart apertures which can receive the ends of said rail members.

5. The swimming pool construction as set forth in claim 1 wherein each of said hollow rail support members is provided with a drain plug disposed adjacent to the outer surface of the lower header.

6. A swimming pool construction of the type which is capable of utilizing solar energy to heat pool water, said swimming pool construction comprising:

pool wall supports which enclose a water reservoir;

a plurality of deck support gussets disposed adjacent said pool wall supports and extending generally normal thereto;

a deck which is supported at least in part by said deck support gussets, said deck also enclosing said water reservoir;

a safety fence enclosing said deck, said safety fence including a plurality of generally horizontally disposed non-fluid conducting rail members;

a plurality of generally vertically extending hollow rail support members which extend upwardly above the deck, each of the hollow rail support members being interconnected with an associated deck support gusset, each of the hollow rail support members containing a plurality of vertically extending internal passageways, one internal passageway including an interior baffle and further including water inlet and outlet means interconnected with said one internal passageway, the inlet means being disposed below the interior baffle and the outlet means being disposed above the interior baffle; and conduits capable of conveying pool water from said water reservoir to and through the inlet means, passageways and outlet means of each of said hollow rail support members and then back to said water reservoir wherein said hollow rail support members form the only active solar energy collecting elements of said safety fence.

7. A swimming pool construction of the type which is capable of utilizing solar energy to heat pool water, said swimming pool construction comprising:

pool wall supports which enclose a water reservoir;

a plurality of deck support gussets disposed adjacent said pool wall supports and extending generally normal thereto;

a deck which is supported at least in part by said deck support gussets, said deck also enclosing said water reservoir;

a safety fence enclosing said deck, said safety fence including a plurality of generally horizontally disposed non-fluid conducting rail members;

a plurality of generally vertically extending hollow rail support members which extend upwardly above the deck, each of the hollow rail support members being interconnected with an associated deck support gusset, each of the hollow rail support members containing a plurality of internal vertically extending branch passageways and upper and lower headers which interconnect the vertically extending branch passageways, the lower header being inclined and having an upper end which interconnects with the lower end of an inclined upper header, and further including water inlet and outlet means interconnected with the passageways; and conduits capable of conveying pool water from said water reservoir to and through the inlet means, passageways and outlet means of each of said hollow rail support members and then back to said water reservoir wherein said hollow rail support members from the only active solar energy collecting elements of said safety fence.

8. The swimming pool construction as set forth in claim 7 wherein one of the vertically extending branch passageways is provided with an interior baffle, the inlet means being disposed below the interior baffle and the outlet means being disposed above the interior baffle.

* * * * *